3,833,695
METHOD AND APPARATUS FOR PRODUCING ELEMENTS BY MOULDING
Paul Benjamin Vidal, Parc de la Noue, Villepinte, Seine Saint-Denis, France
Filed Mar. 20, 1972, Ser. No. 236,073
Claims priority, application France, Mar. 22, 1971, 7109982
Int. Cl. B29d 27/03
U.S. Cl. 264—47    7 Claims

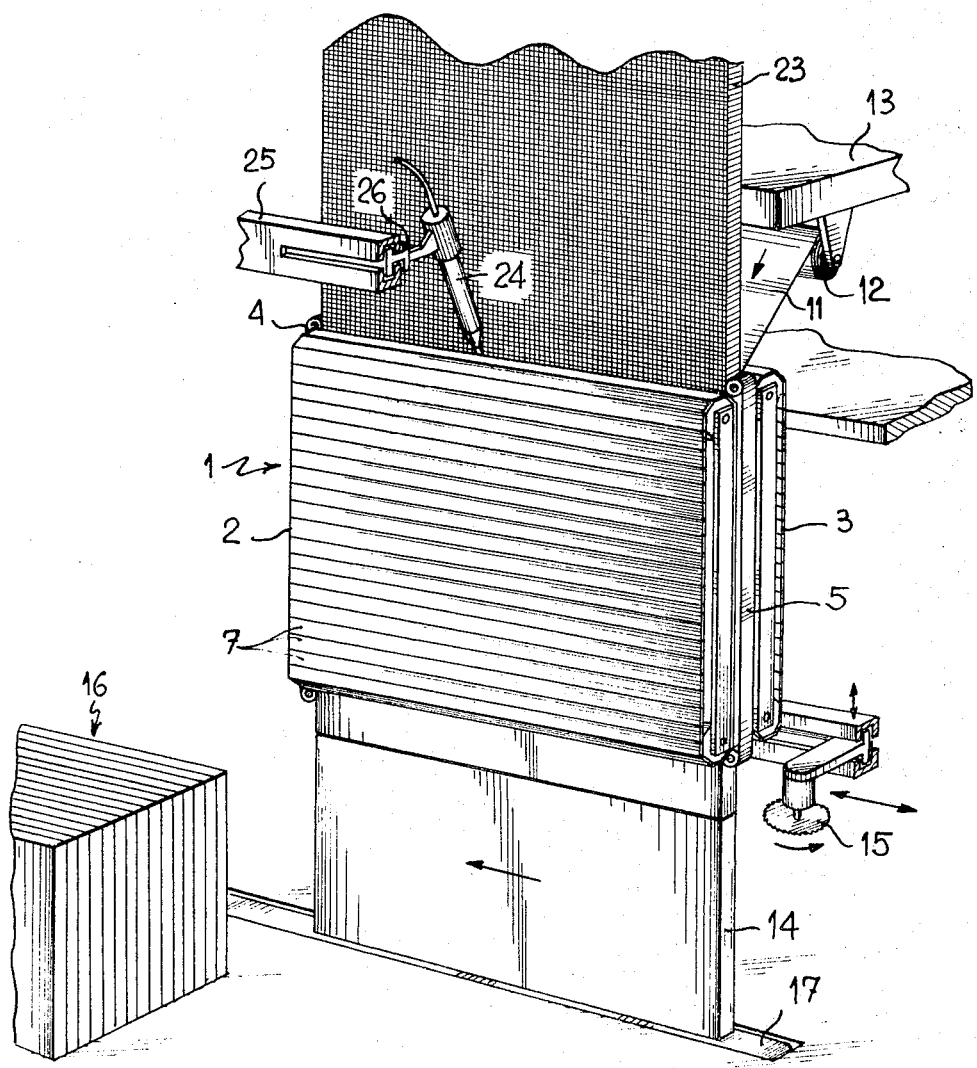

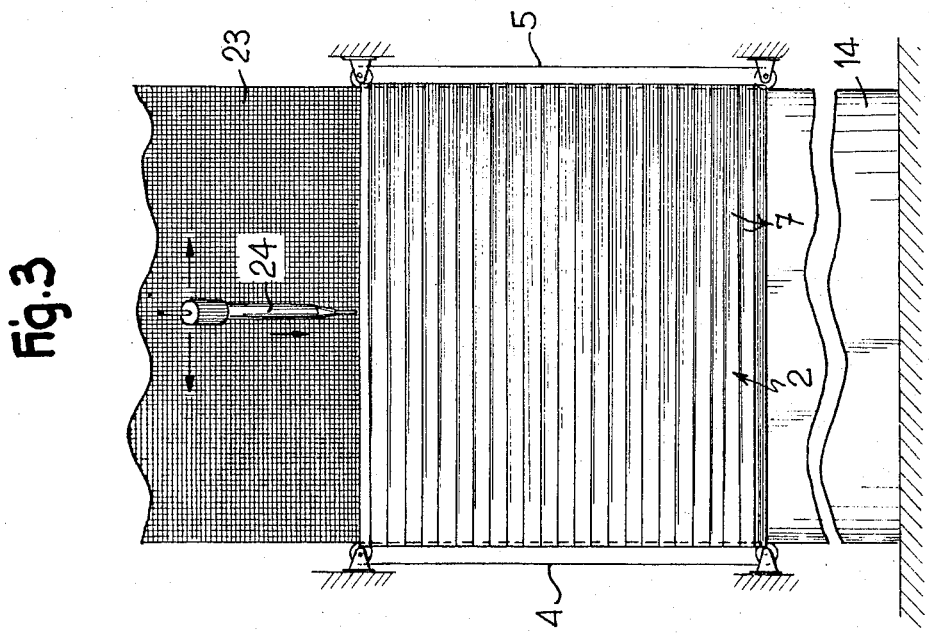
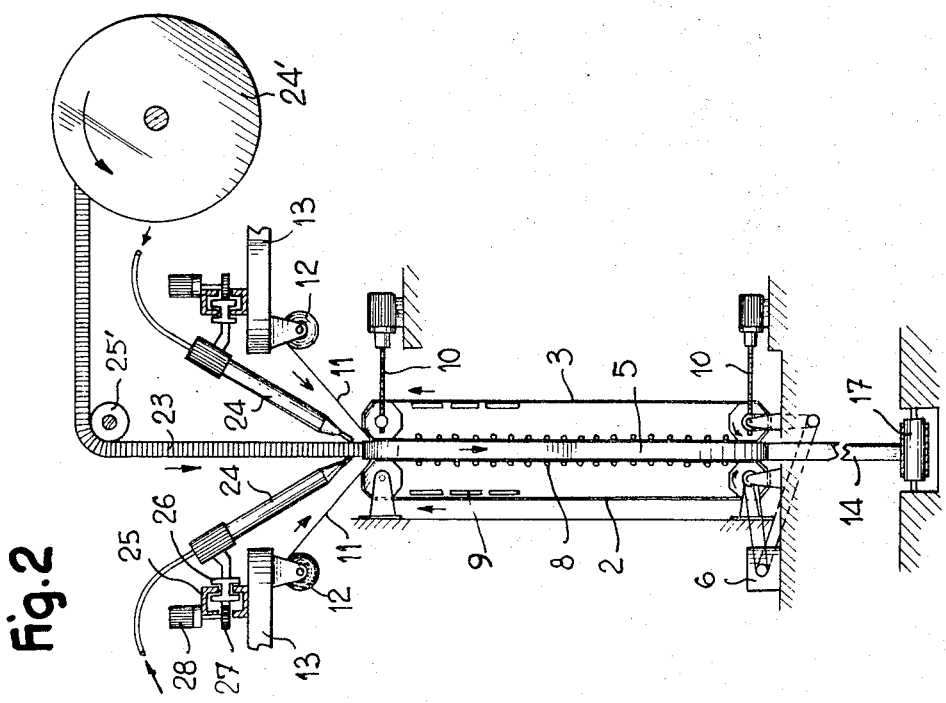

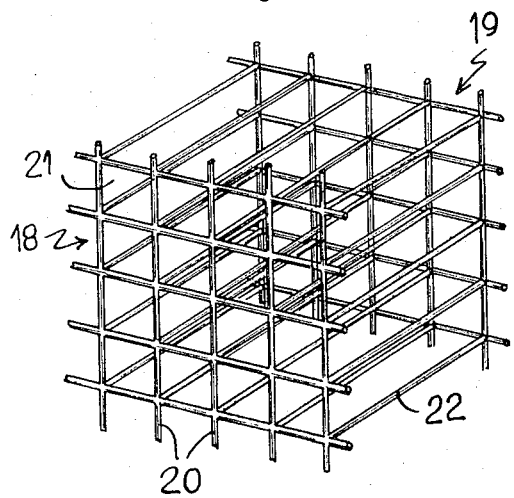
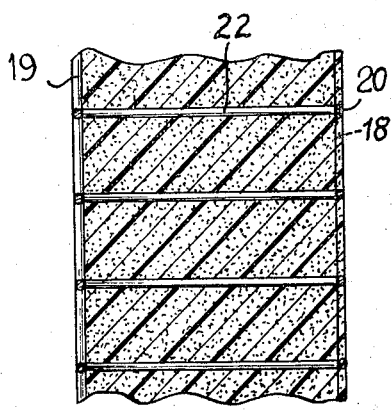
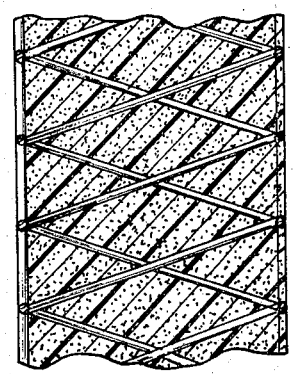
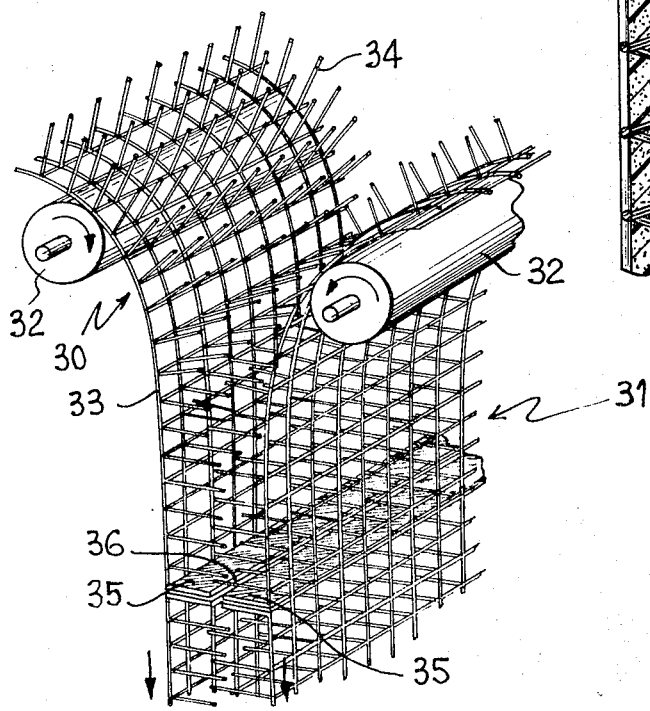

ABSTRACT OF THE DISCLOSURE

The disclosure herein describes a method for producing panels by moulding. A porous grid is introduced into a vertical mould consisting of endless belts moving from top to bottom of the mould. At the same time, a filler material, such as an expansible phenolic resin, is fed into the mould through pouring heads which carry out a reciprocating motion along the upper part of the mould. The phenolic resin expands in the grid, occupying all of the pores or cells therein. The panel obtained may be used in building to construct walls, partitions, floors, and ceilings.

---

The present invention relates to a method for producing large moulded elements, especially for structural purposes, for building walls, partitions, floors or ceilings.

The invention also relates to elements, such as panels, made by this method and comprising a grid immersed in a filler material exhibiting, prior to the moulding operation, a non-solid appearance, for example a liquid, powder, or a viscous appearance, the filler material being adapted to solidify in the mould and having very poor mechanical strength when used alone.

Panels having an internal reinforcing grid are, of course, already known, but in these cases the reinforcement represents only a small part of the volume of the finished panel, in order to avoid increasing the weight thereof, especially when the filler is a low-density material. As a result of this, the reinforcement is often no more than a central core to which the filler adheres.

Although this type of panel does not break right through, it is nevertheless superficially fragile and is not immune to cracks arising from impact, which make it unfit for the application for which it is intended.

Moreover, if it is desired to eliminate this defect, the weight of the reinforcement, and thus of the finished panel, must be increased, and this largely eliminates the advantage of using a light filler material.

The present invention proposes a method whereby it is possible to obtain, by moulding, low-density panels having considerable mechanical strength, the method consisting in:

Producing a light, porous grid in which the solid parts are joined together and the pores communicate with each other;

Introducing this grid into the mould in such a manner that it substantially fills the entire volume thereof; and Pouring the filler material into the mould in such a manner that it enters into all the pores in the grid and solidifies therein.

The filler material is preferably poured into that part of the mould into which the grid is inserted, and this operation takes place as the grid is being introduced into the mould.

The method according to the invention lends itself well to the production of continuous panels. It is thus conceivable to produce continuously an endless element which may be cut off at the outlet from the mould into a plurality of panels; in this case the grid is of considerable length and moves continuously through the mould, the filler material also being poured in continuously.

In one embodiment of the invention, use is made of a series of grids of limited length introduced into the mould consecutively, the pores of one grid being insulated from the pores of the preceding and following grids. and the filler material being still poured in continuously as the grids move through the mould.

This separation of consecutive grids may be accomplished, for example, by equipping the grids, at the location where the panels are to be separated, with an element which wholly or partly shuts off communication between the adjacent pores of successive grids.

It is desirable to use, for the execution of this method, a vertical mould in which the grids, arranged vertically, move vertically from top to bottom of the mould.

According to the invention, the porous grid consists of layers, the structure of which is a porous network, meshes for example, consisting of elongated solid elements, these layers being arranged in such a manner that at least two of them are parallel with each other, a third porous network, also consisting of solid elements, extending in a direction generally at an angle to the plane of the layers, and this third network being connected to each of the other two at least locally. It should be noted that the term "solid" used in defining the elements of the networks does not necessarily mean that they are rigid, in fact flexible and deformable elements may be used. Generally speaking, the grid may be made of any kind of low-density material: natural or synthetic textiles, light-metal wire or strip, glass fibre, synthetic-resin filaments, paper, cardboard, and vegetable, mineral, or animal matter (such as vegetable fibres or hair, for example). This will make it possible to produce flexible or rigid nets, the meshes of which cannot run. However, this is not intended to be restrictive, since the said grid may also be made of perforated corrugated sheet made of cardboard, paper, plastic sheet, mineral materials etc....

As already indicated, the grid is intended to occupy practically the whole volume of the mould. To this end, when the grid is introduced into the mould, the two parallel layers are spaced apart at a distance corresponding to the thickness of the finished panel and assuming the shape of the walls of the mould.

It will be noted that the grid may be produced well before it is fed into the mould, at which time it may be unwound from a roll; on the other hand the grid may be produced at the moment of introduction into the mould. In the latter case, the surfaces of the two layers which will face each other in the finished grid will have attachment elements (fibers, for example) to form the third network. The two elements will be drawn from separate rolls and will hook into each other immediately ahead of the mould, as they enter it.

For building purposes specificaly, prefabricated panels intended to be used for walls should have properties such as:

mechanical strength in bending, impact,
lightness,
satisfactory heat and sound insulation,
resistance to action of heat, and above all, flames,
satisfactory appearance of the surface of the panel.

There is one material that meets these various requirements particularly well. This is an expansible plastic material known as phenolic resin which may be in the form of a liquid. a paste, or a powder, but is in the form of a paste in the mould, so that it subsequently expands and solidifies.

The invention therefore proposes to use as the filler material a phenolic foam, with or without mineral, vegetable and/or synthetic additives.

A structural panel according to the invention is characterized in that it comprises, at least on each longitudinal surface, a superficial layer consisting of a meshed network, an internal network running between these two superficial layers, the network consisting of a plurality of elongated solid elements in spaced relationship with each other and located at an angle to the two layers, the whole being immersed in a phenolic foam which fills all the cells in the grid which communicate with each other.

The method according to the invention thus produces, in a single operation, a panel which, in addition to mechanical, insulating, and other properties, has the advantage of being able to be produced in any desired length and of requiring no subsequent coating operations. This makes available large self-supporting surfaces which, when being assembled, have no need of the uprights, beams, and cross-pieces required to support and connect conventional panels of limited areas. There is also a saving in time and labour. It will also be understood that the method is highly flexible in use, and that all kinds of panels may be obtained by using different materials (both for the grid and for the filler) and by altering the shape, thickness, and density of the panel, bearing in mind the requirements in respect of heat and sound insulation, mechanical strength, and other properties.

An example of embodiment of the invention will now be described with reference to the attached drawings, wherein:

FIG. 1 is a schematic perspective view of an embodiment for the production of panels according to the invention;

FIGS. 2 and 3 are schematic side and front elevational views of the unit shown in FIG. 1;

FIG. 4 shows, to an enlarged scale and in perspective, an example of a one-piece grid;

FIGS. 5 and 6 show details of panels produced with two different types of grid, in section; and FIG. 7 shows a grid being assembled from two complementary parts.

The following description relates more particularly to the continuous production of structural panels in which the filler material is expanded phenolic foam. This should not be considered restrictive, since any type of filler material compatible with the invention may be used.

In FIG. 1, 1 is a schematic representation of a continuous moulding machine of known type and will therefore not be described in detail. It will be sufficient to indicate that this machine comprises a substantially vertical moulding channel, open at top and bottom, and defined by moving walls consisting of four endless belts 2, 3, 4 and 5 mounted on rollers which drive them in synchronism, in the direction indicated in FIG. 2, from a motor 6. As may be seen in FIG. 2, the moving walls constituting the channel run continually from top to bottom.

Belts 2 and 3 preferably consist of a series of contiguous metal plates 7 hinged to each other. The descending runs of these belts are guided by support rollers 8 which keep the descending runs at a constant distance apart. Stationary heating elements 9 may with advantage be arranged in the vicinity of the ascending belt runs. The distance between the descending runs may be adjusted by any appropriate system, such as a system of screws 10 acting on the axes of a pair of rollers carrying an endless belt 2 or 3. This adjustment makes it possible to obtain moulded panels of various thicknesses.

In order to facilitate removal from the mould, and to provide protection for the surfaces of the moulded panels, protective films, for instance strips of paper 11, are unwound from rolls 12 carried on a frame 13, the paper running along the whole length of the descending runs of the belts.

The grid for the panel, and the filler material, are fed into the open top of the moulding machine, the moulded panel emerging from the bottom of the machine.

It will be noted in this connection that, for obvious reasons of space, the continuous element issuing from the machine should preferably be cut into a series of panels, such as 14, for example, by means of the circular saw illustrated schematically at 15 which moves back and forth in the direction of the double arrow and follows the descending movement of the panel during the whole of the sawing operation. The cut panels are then removed to a storage area 16, for example by means of a horizontal conveyor shown schematically at 17 (FIG. 2).

FIG. 4 shows one type of grid used to reinforce a panel, the grid being made in a single block. In this case, the grid consists of two parallel layers 18, 19 made of intersecting fibres 20, for example synthetic or natural fibres (nylon, metal wire, glass fibre, etc.) which are integrated by weaving, knotting, welding, or any other appropriate means, to produce a meshed net 21. These meshed nets are joined together by a network of filaments 22 joined by their ends to the net filaments, i.e. to the intersections of filaments 20, as shown, at the side. These filaments 22 may be of the same nature as filaments 20 or they may be different. They may be rigid or flexible, parallel as shown in FIGS. 4 and 5, or crossed as shown in FIG. 6.

The grid thus obtained has a multitude of cells or pores which communicate with each other.

This grid, marked 23 in FIGS. 1 to 3, is fed to the moulding machine by a roller 24' and passes over a tensioning drum 25'. It will be noted that the grid, when it enters the mould, must be at its maximum thickness so that nets 18, 19 rests against the moving walls of the mould. This means that it filaments 22 are flexible, in order to allow the grid to be wound in the crushed condition, the two layers 18, 19 must be separated before entering the mould and must be in a relatively stretched condition.

In order to achieve this, the grid will be suitably arranged at the input to the installation by applying continuous vertical tension to the layers and keeping them suitably spaced apart, for example by spacing wedges.

At the inlet to the mould, a homogeneous mixture of expansible products, comprising the necessary additives for expanding and hardening, are injected into moving grid 23. In the case of a phenolic foam, the mixture has the appearance of an unctuous cream fed to at least one pouring head 24 by a feed arrangement of known type, not shown.

Head 24 moves back and forth horizontally over the whole width of the machine in the direction of the double arrow in FIG. 3. This movement may be achieved by means of a rail 25 attached to frame 13 and a nozzle bracket 26 equipped with a rack engagement with a driving gear 27 accommodated in the rail and driven by a motor 28.

It is, of course, possible to use, instead of a single head 24, two heads arranged, as shown in the drawing, symmetrically in relation to the vertical centreline of the machine, the two heads preferably moving in opposite directions.

Within the mould, the phenolic resin expands under the action of an expanding agent which produces an appreciable increase in volume. However, the mould restricts this expansion to the free surface of the expanding material. Moreover, since the grid moves downwards at a speed synchronized with the speed of expansion, the level of the expanding material filling the cells of the grid remains substantially constant. The reciprocating motion of heads 24 leaves the phenolic foam time to expand at each location in the grid before more of the viscous mixture is introduced.

The expansion of the resin forces sides 18, 19 of the grid towards the walls of the mould, thus placing the transverse network of filaments under tension.

Sections of the panels obtained may have the appearance shown in FIGS. 5 and 6. It may be seen that sides 18, 19 remain at the surface, even though they are immersed in the phenolic compound.

It will be understood that the phenolic compound is divided into a multitude of blocks joined to each other, and that this prevents any deterioration of the panel as a whole. Thus if a blow is applied to the panel, the latter may be damage at the point of impact, but only there; the panel as a whole will stand up.

Instead of the grid being prefabricated and delivered in one piece, it is conceivable that it could be assembled, immediately ahead of the moulding machine, from two separate layers 30, 31 (see FIG. 7) supplied from two rollers 32 symmetrical with the axial plane of the machine. In this case, each layer, 30, 31 would consist of a net 33, similar to 18 and 19, carrying on its inside surface filaments 34 running obliquely and preferably more or less perpendicularly to the plane of the net. When the nets come face to face in the mould, filaments 34, which are sufficiently rigid, intersect, become entangled, and become joined to each other and to the opposing net, finally producing a grid having the same appearance as those shown in FIGS. 5 and 6.

In order to facilitate separation of consecutive panels, even without using a saw, the continuous grid may be replaced by a series of grids (FIG. 7) having at their upper and lower edges transverse elements 35 integral with the nets at the locations at which the panels are to be separated. These elements 35 will preferably be solid, but will have a pasage 36 to allow the phenolic resin to expand from one grid to the other. Consecutive panels will therefore be joined together by thin tongues of material which can easily be broken by a light blow at this location. In order to centre consecutive grids and connect them to each other temporarily as they are being fed into the mould, any suitable means (not shown) may be used, such as lugs integral with one end of a grid entering apertures provided in the end of the adjacent grid. It will be understood that, under these conditions, the lower panel will be released from the upper panel by its own weight.

This arrangement, or other similar arrangements, may also be applied in the case of a single-piece grid.

Although only one particular type of grid has been described, the invention is not restricted thereto. Thus instead of non-run nets knotted, woven, welded together, and flexible or rigid, use may be made of strips forming a grid, corrugated perforated sheet, or cellular blocks in various mineral, vegetable, metallic, synthetic, etc. materials. These grids may be used in one or several pieces.

It will also be observed that the panels obtained may be solid or may have apertures cut into the finished panels or formed during the moulding operation. In the latter case, the moving walls of the mould will carry suitable dies to provide free passages in the panels. Moreover, in a general way, the moving walls, instead of being flat, may have corrugations which are reproduced on the panels.

The invention having now been disclosed, applicant reserves exclusive right thereto with no limitation other than that of the terms of the following claims.

What I claim is:

1. A method for continuously producing reinforced panels consisting of an expansible material and of a reinforcing grid designed to impart to the panels improved mechanical properties, comprising the steps of:
   producing a light porous grid with two superficial layers having flexible properties and transverse filaments adapted to join said layers to each other, said grid being wounded;
   continuously unwounding said grid and introducing said grid into a substantially vertical mould from the open upper edge to the lower edge, so that the grid, in moving, sweeps substantially the whole internal volume of the mould; and
   pouring, as the grid moves through the mould, an expansible material at the upper end of the mould and through at least one of the superficial layers, so that it enters all of the pores in the gird and solidifies therein.

2. A method according to claim 1 wherein said grid is of indefinite length and is caused to pass continuously through the mould, thereby constituting an endless reinforced element which is subsequently cut into a plurality of panels.

3. A method according to claim 1 wherein a set of grids is fed consecutively into the mould for the continuous production of separate panels, the assembly of pores in one grid being isolated from the assembly of pores in the preceding and following grids.

4. A method according to claim 1, characterized in that the expansible material is poured into the mould successively at various locations over the width thereof, in order to allow the material to expand freely and to keep it at a substantially constant level in the mould in relation to the grid movement.

5. A method according to claim 1 wherein said layers are made of mesh net; further comprising the step of locating, between the opposing faces of said two layers, a third flexible net which is connected to each of the two layers at least locally.

6. A method according to claim 5, characterized in that when the grid is fed into the mould, the two layers are spaced apart by a distance corresponding approximately to the thickness of the panel to be produced, said layer preferably following the shape of the walls of the mould.

7. A method according to claim 1, characterized in that the expansible material is phenolic resin.

References Cited

UNITED STATES PATENTS

| | | | |
|---|---|---|---|
| 2,972,554 | 2/1961 | Musket et al. | 264—47 |
| 3,210,446 | 10/1965 | Yamakawa et al. | 264—47 |
| 3,555,131 | 1/1971 | Weismann | 264—47 |
| 3,617,594 | 11/1971 | Willy | 264—47 |
| 3,649,731 | 3/1972 | Cronin | 264—47 |
| 3,660,548 | 5/1972 | Komada et al. | 264—47 |

MAURICE J. WELSH, Primary Examiner

U.S. Cl. X.R.

161—60; 425—4